(12) United States Patent
Wright et al.

(10) Patent No.: US 6,351,875 B1
(45) Date of Patent: Mar. 5, 2002

(54) APPARATUS FOR SECURING A LEVEL AND A STRUCTURAL COMPONENT TO ONE ANOTHER

(75) Inventors: Randall J. Wright, Hartland; Joseph B. Coel, Waterford, both of WI (US)

(73) Assignee: Empire Level Mfg. Corp., Milwaukee, WI (US)

( * ) Notice: Subject to any disclaimer, the term of this patent is extended or adjusted under 35 U.S.C. 154(b) by 0 days.

(21) Appl. No.: 09/429,841

(22) Filed: Oct. 29, 1999

(51) Int. Cl.[7] .......................... A44B 21/00; G01C 9/28
(52) U.S. Cl. ........................ 24/482; 24/300; 24/370; 33/350
(58) Field of Search ................ 24/482, 300, 370, 24/715.3; 33/350

(56) References Cited

U.S. PATENT DOCUMENTS

| ,294,449 | A | * | 3/1884 | Day ........................ 24/370 |
| 1,108,134 | A | * | 8/1914 | Cassity ..................... 33/350 |
| 4,463,501 | A | * | 8/1984 | Wright et al. ............... 33/350 |
| 4,569,108 | A | * | 2/1986 | Schwab .................... 24/300 |
| 4,979,310 | A | * | 12/1990 | Wright ..................... 33/379 |
| 5,168,605 | A | * | 12/1992 | Bartlett .................... 24/300 |
| 5,317,788 | A | * | 6/1994 | Esposito et al. ............ 24/300 |
| 5,351,367 | A | * | 10/1994 | Kennedy et al. ........... 24/300 |
| 5,651,633 | A | * | 7/1997 | Howe ...................... 24/300 |
| 5,940,978 | A | | 8/1999 | Wright et al. .............. 33/381 |

FOREIGN PATENT DOCUMENTS

| AT | 0163232 | * | 6/1949 | ............... 24/300 |
| FR | 1407486 | * | 6/1965 | ............... 24/370 |

* cited by examiner

Primary Examiner—Victor N. Sakran
(74) Attorney, Agent, or Firm—Jansson, Shupe & Munger

(57) ABSTRACT

An apparatus is used to mount a spirit level on an elongate support such as a pipe, length of wood or the like so that the effective "levelling line" is greatly lengthened. The apparatus includes an elastic band having first and second ends and a body member to engage the level, preferably by bridging a rib on the level or by fitting to an aperture formed in the level. The body member has first and second hooks extending from it to receive the first and second band ends, respectively. In highly preferred embodiments, there are two elastic bands and two body members, each with a pair of hooks for engaging and retaining a respective one of the bands.

17 Claims, 4 Drawing Sheets

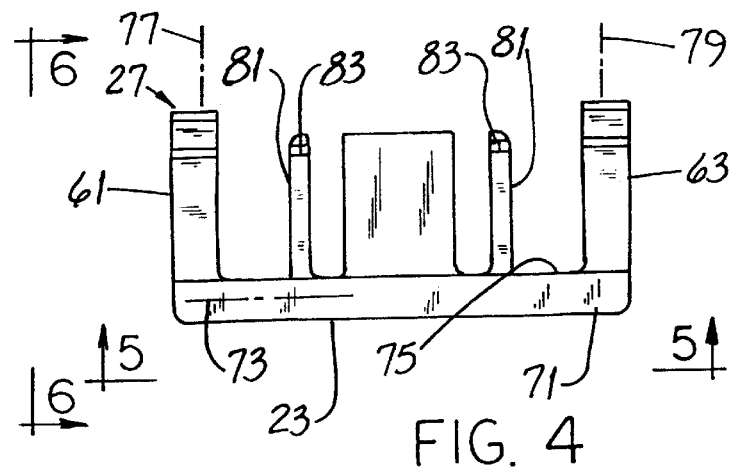
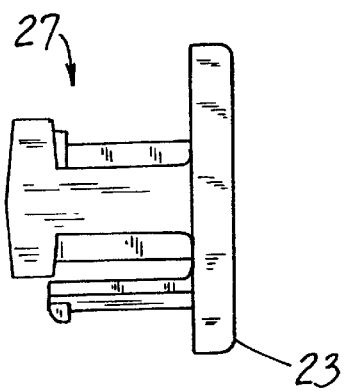
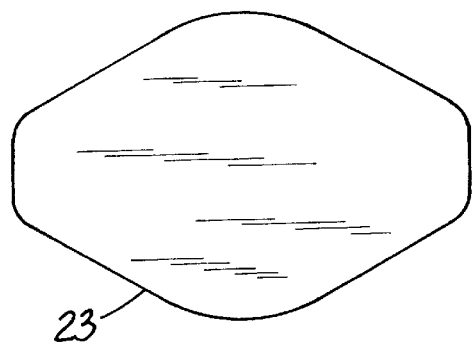
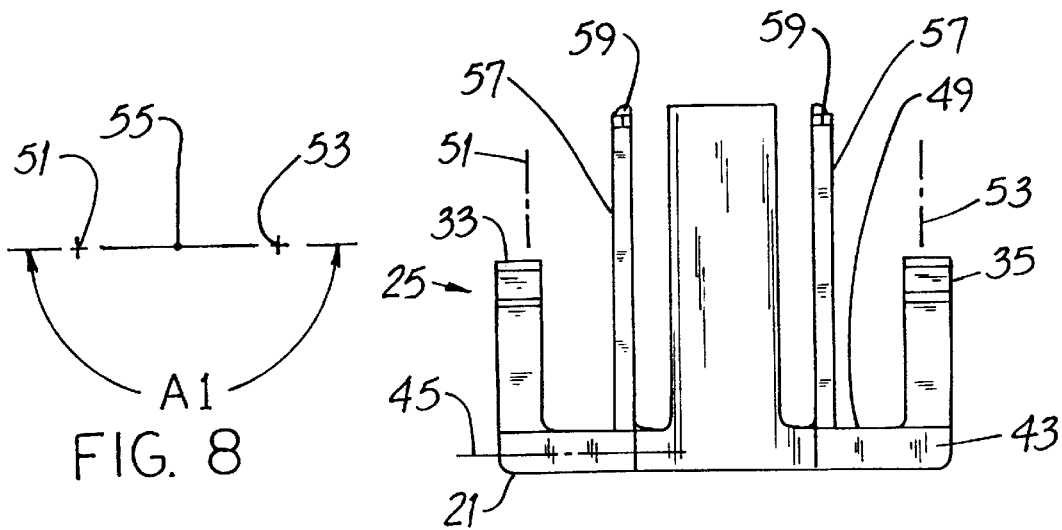

APPARATUS FOR SECURING A LEVEL AND A STRUCTURAL COMPONENT TO ONE ANOTHER

FIELD OF THE INVENTION

This invention relates generally to geometrical instruments and, more particularly, to such instruments of the straightedge type used by carpenters, masons and the like during building construction.

BACKGROUND OF THE INVENTION

During construction of a building and for other purposes, it is desirable, even mandatory, that some sort of spirit level (or simply "level") be used to help assure that structural components, e.g., studs, pipes and the like, are horizontal, vertical or, in the case of pipes, are properly "pitched" angularly from the horizontal to promote water flow. One known type of level used for the aforementioned purposes is made by Empire Level Mfg. Co. of Milwaukee, Wis. The level is small, pocket-sized and very handy. Other common types of levels may be 3 feet (about 91.5 cm.) in length or even much longer.

But irrespective of the precise type of level, their use is attended by a requirement which the prior art has not entirely addressed. Specifically, it is often necessary to secure the level to the structural component being installed so as to permit such component to be manipulated into position without having to hold the level in place at the same time. As but one example, a carpenter may need both hands free to plumb a wood wall stud and then nail it into place. As another example, a plumber may need both hands free to angularly "pitch" a pipe a few degrees from a horizontal reference line. If the pipe is a cast iron pipe, a magnetically attached level will meet the need. But if the pipe is made of certain other materials such as, but not limited to, non-magnetic polyvinyl chloride (PVC) or copper, such a level cannot be attached thereto.

An apparatus which permits "hands free" attachment of a level and a magnetic or non-magnetic structural component to one another would be an important advance in this field.

OBJECTS OF THE INVENTION

It is an object of the invention to provide an apparatus for mounting a level which overcomes problems and shortcomings of the prior art.

Another object of the invention is to provide such an apparatus which permits a level and a structural component to be attached to one another.

Yet another object of the invention is to provide an apparatus which permits a level and a non-magnetic structural component to be attached to one another. How these and other objects are accomplished will become apparent from the following descriptions and from the drawings.

SUMMARY OF THE INVENTION

The invention involves an apparatus for mounting a level on a building structural component. The apparatus includes a securing device having a body member to engage the level. First and second hooks extend from the body member to receive the first and second ends, respectively, of an elastic band. Conveniently, the elastic band may be embodied as a heavy-duty rubber band or the like.

In more specific aspects of the invention, the body member extends along a body plane which is substantially perpendicular to a long axis of the level. The hooks extend axially along respective hook axes which are substantially perpendicular to the body plane, i.e., which are substantially parallel to the level long axis. Measured coincident with the plane (and using a circle center in the plane), the included angle between the hook axes is about 180°. Most preferably, the body member also has a retention rib extending along a rib axis which is substantially perpendicular to the body axis.

In another embodiment, the hooks extend radially form the body member and are coincident with the body member plane. The included angle between the hook axes is usually less than 150°.

While one securing device and its body member may be used to mount the level on the structural component, it is most preferred to use two body members spaced apart by a dimension not much less than the overall length dimension of the level. In that way, the level and the component are best secured against twisting motion relative to one another.

Accordingly, the aforementioned band, body member, body axis retention rib and rib axis might be termed "first band", "first body member" and so forth. Another embodiment of the apparatus also has a second elastic band having third and fourth ends. A second body member extends along a second body axis and includes a second retention rib extending along a second rib axis substantially parallel to the first rib axis. Third and fourth hooks extend from the second body member to receive the third and fourth ends, respectively, of the second elastic band. Either or both retention ribs may include a hook-like abutment shoulder to engage the level.

Yet other aspects of the invention involve the combination of a level, a structural component and an apparatus for securing the level and the component to one another. In such combination, the apparatus includes a securing device engaging the level and an elastic band around the component and engaging the securing device. Most preferably, the combination includes two securing devices engaging the level. And first and second elastic bands are around the component and engage the first and second securing devices, respectively.

The first securing device includes a first body member having a first pair of hooks extending from it. Similarly, the second securing device includes a second body member having a second pair of hooks extending from it. A first elastic band engages the first pair of hooks and a second elastic band engages the second pair of hooks. The points of contact of the two securing devices with the level and of the two elastic bands with the component are spaced by a dimension preferably at least equal to 60% of the length of the level and, for a specific level, by a dimension about equal to 70–90% or more of the length of the level.

A specific level includes first and second apertures which are formed axially in the level and which are defined by respective aperture walls. For such a level, the first and second securing devices are configured to extend "plug-like" into the first and second apertures, respectively. At least the first securing device includes a retention rib contacting the wall. More preferably, each of both securing devices includes one or plural retention ribs. Such ribs may be selected to frictionally engage the wall of its respective aperture and be retained there by such friction. Or at least one rib on each of both securing devices may be somewhat resilient and include a hook-like abutment shoulder as mentioned above. To remove the securing device, the rib is bent radially inwardly until the abutment shoulder is released from engagement with the level.

The securing devices may be configured so that the hooks thereof extend axially or radially from the body member. Axially extending hooks are seemingly less apt to be inadvertently broken off by accidental "bumping" while radially extending hooks have substantially less bending moments imposed upon them by the elastic band which engage them.

Further details of the invention are set forth in the following detailed descriptions and in the drawings.

BRIEF DESCRIPTIONS OF THE DRAWINGS

FIG. 4 is a top plan view of the securing device shown in FIG. 3.

FIG. 5 is an end elevation view of the securing device shown in FIGS. 3 and 4 taken along the viewing plane 5—5 of FIG. 4.

Figure 3:
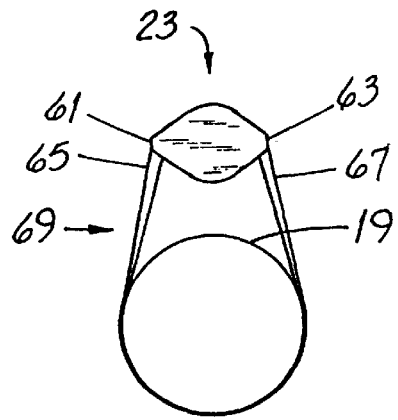
FIG. 3 is an end elevation view of another one of the securing devices of the apparatus of FIG. 1 shown in conjunction with another elastic band and the component. The level is omitted for clarity.

FIG. 6 is a side elevation view of the securing device shown in FIGS. 3, 4 and 5 taken along the viewing plane 6—6 of FIG. 4 and rotated 90°.

Figure 2:
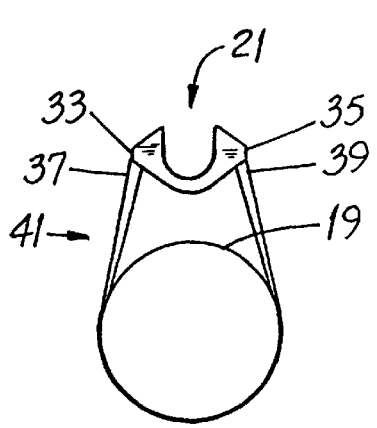
FIG. 2 is an end elevation view of one of the securing devices of the apparatus of FIG. 1 shown in conjunction with an elastic band and the component. The level is omitted for clarity.

FIG. 7 is a top plan view of the securing device shown in FIG. 2.

FIG. 8 represents the angular relationship between axes of respective hooks of the device shown in FIG. 7. The angular relationship between axes of respective hooks of the device shown in FIGS. 4, 5 and 6 is substantially identical.

Figure 9:
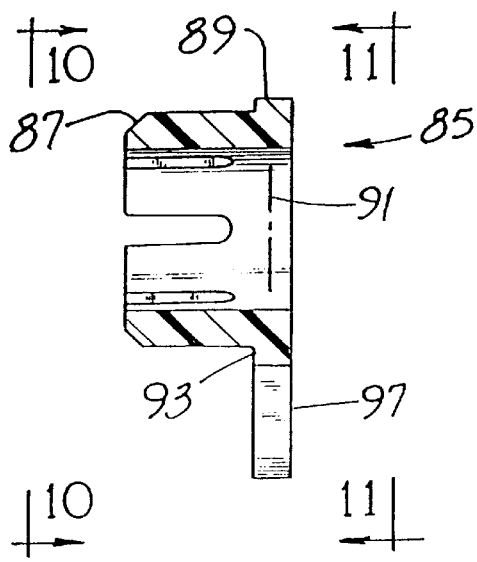

FIG. 9 is a sectional side elevation view of another embodiment of a securing device used to form the apparatus.

Figure 10:
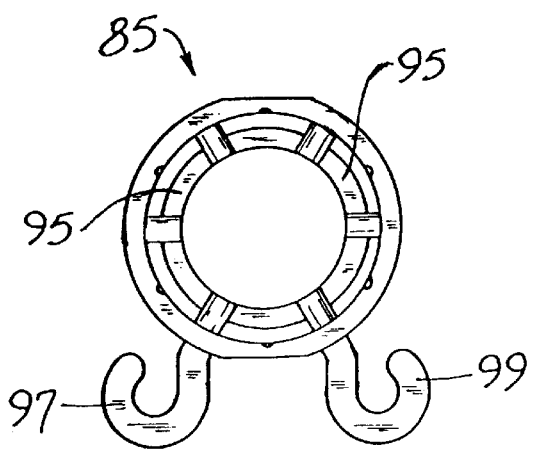

FIG. 10 is an end elevational view, in full representation, of the securing device shown in FIG. 9 taken along the viewing plane 10—10 thereof.

Figure 11:
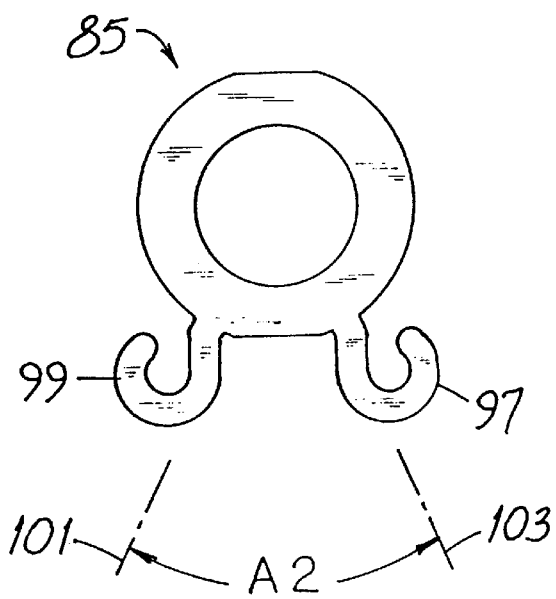

FIG. 11 is an end elevation view, in full representation, of the securing device shown in FIG. 9 taken along the viewing plane 11—11 thereof.

Figure 12:
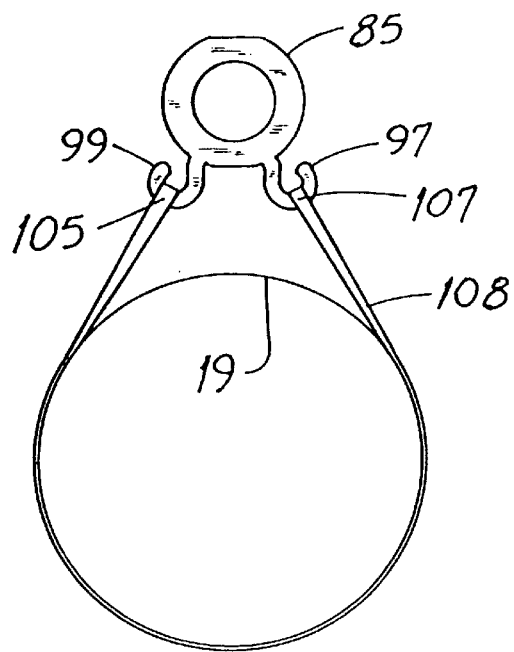

FIG. 12 is an end elevation view of the securing device of FIGS. 9–11 shown in conjunction with an elastic band and the structural component. The level is omitted for clarity.

Figure 13:
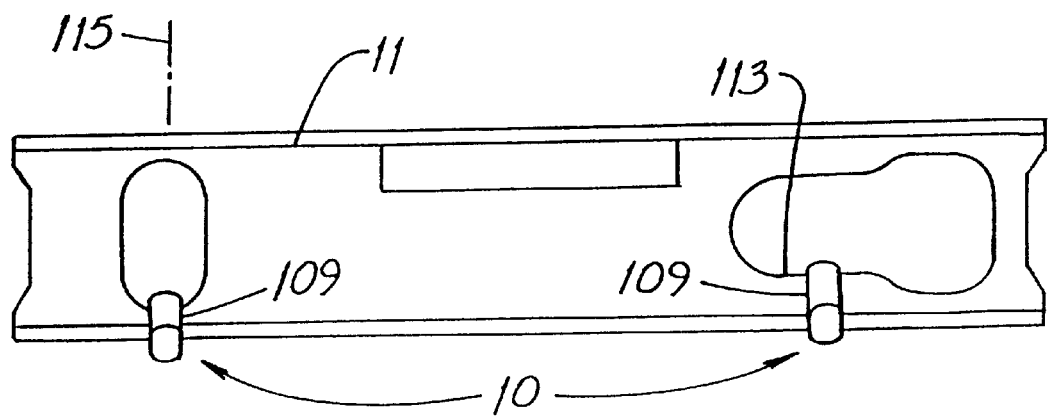

FIG. 13 is a side elevation view of yet another embodiment of a securing device, a preferred pair of which is used to form the apparatus. The devices are shown in conjunction with a laser level.

Figure 14:
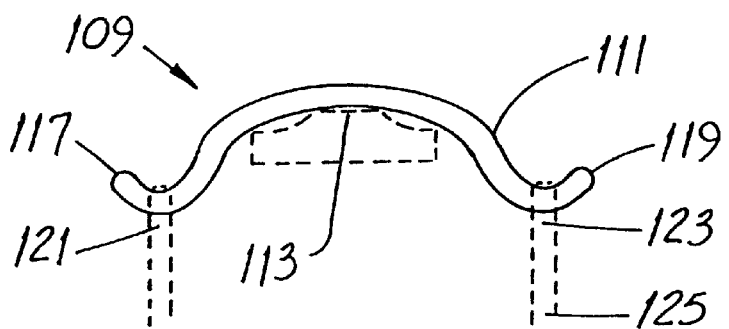

FIG. 14 is a representative end elevation view of one of the securing devices of FIG. 13. Surfaces of the laser level and of an elastic band are shown in dashed outline.

DETAILED DESCRIPTIONS OF PREFERRED EMBODIMENTS

Figure 1:
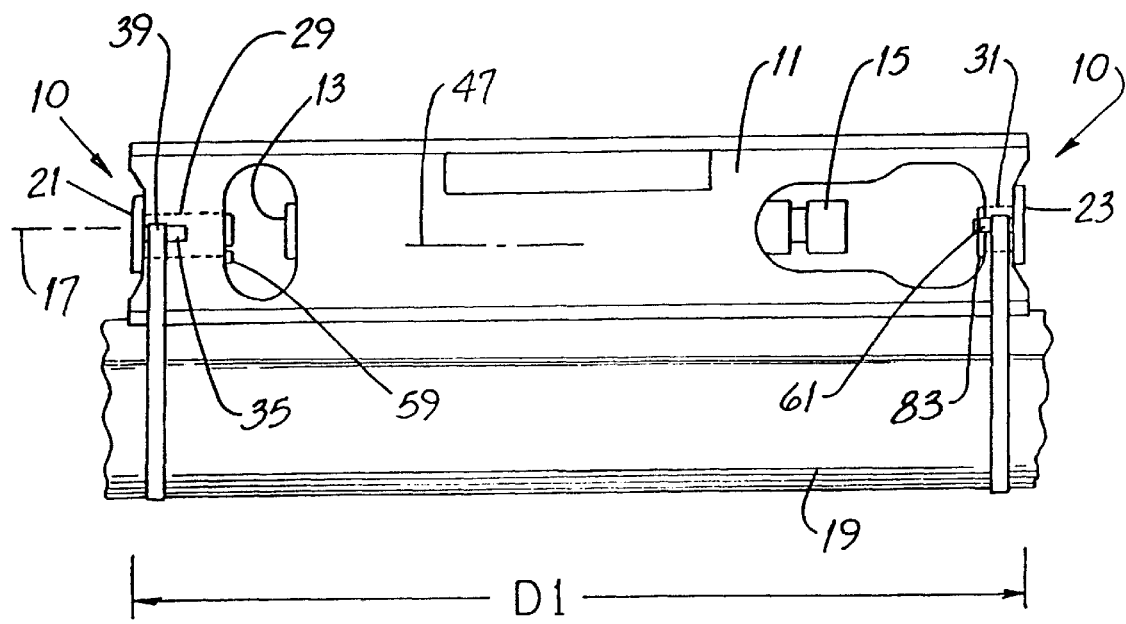
FIG. 1 is a side elevation view of one embodiment of the inventive apparatus shown in conjunction with a level and a structural component. Parts are broken away.

Referring first to FIGS. 1 through 7, the inventive apparatus 10 is used with a laser level 11 of a known type. A battery-powered laser light source 13 is mounted in the level 11 and such source 13 has an "on-off" knob 15. When the knob 15 is turned to the "on" position, the source 13 projects a coherent laser light beam along the axis 17. Conveniently, the apparatus 10 may also include (and in a preferred embodiment, does include) two spirit level vials (not shown), one each for level and plumb measurements. The apparatus 10 is used to mount the level 11 on a structural component 19, usually an elongate, linear component 19 such as a pipe (as shown in FIGS. 1, 2 and 3), a 2×4 or the like. Usually, the component 19 is significantly longer than the level 11.

The apparatus 10 includes first and second securing devices 21 and 23, respectively. Each such device 21, 23 has a body member 25, 27, respectively, to engage the level 11. Engagement with such level 11 is by being fitted into first and second apertures 29, 31, respectively, which are formed in the level 11.

The first body member 25 also has an enlarged head 43 which extends along a body plane 45 substantially perpendicular to a long axis 47 of the level 11. The head 43 is dimensioned to be larger than the aperture 29 and thereby form an abutment shoulder 49 which contacts the level 11 and prevents the body member 25 from moving further toward the middle of the level 11, i.e., rightwardly as viewed in FIG. 1.

The first body member 25 also has first and second hooks 33, 35, respectively, which extend from the body member 25 to receive the first and second ends 37, 39, respectively, of an elastic band 41, e.g., a heavy-duty rubber band or the like. In a specific embodiment, each hook 33, 35 is generally T-shaped as in FIG. 6. Each hook 33, 35 extends axially along a respective hook axis 51, 53. Such axes 51, 53 are substantially perpendicular to the body plane 45 and substantially parallel to the level long axis 47. Considering FIG. 8, measured coincidently with the plane 45 (and using a circle center 55 in the plane 45), the included angle A1 between the hook axes 51, 53 is usually, but not necessarily, about 180°.

Most preferably, the first body member 25 also has at least one, and preferably, a pair of retention members 57 affixed thereto. Each member 57 has a retention rib 59 which is substantially perpendicular thereto extending along the axis 47. When a retention member 57 is configured to include the rib 59, it is preferred that each such member 57 be somewhat resilient. In that way, one can remove the securing device 21 by bending the retention member(s) 57 radially inwardly until the rib(s) 59 "clear" the aperture 29. The aforementioned band 41, body member 25, retention member(s) 57, and retention rib(s) 59 are also referred to herein as the "first" band, "first" body member, and so forth.

Similarly, the second body member 27 has third and fourth hooks 61, 63 respectively, with which to receive the third and fourth ends 65, 67, respectively, of a second elastic band 69. The second body member 27 also has an enlarged head 71 which extends along a body plane 73 substantially perpendicular to the long axis 47 of the level 11. The head 71 is dimensioned as described above and has a second abutment shoulder 75 which contacts the second aperture 31 and prevents the body member 27 from moving further leftwardly as viewed in FIG. 1.

Each of the third and fourth hooks 61, 63 extends axially along a respective hook axis 77, 79. Such axes 77, 79 are substantially perpendicular to the body plane 73 and substantially parallel to the level long axis 47. And when the apparatus 10 is used to mount a level 11 and a component 19 to one another, the axes 53, 77 are substantially coincident and the axes 51, 79 are substantially coincident.

The second body member 27 has at least one and preferably two second retention members 81 affixed thereto. Each such member 81 has a second retention rib 83 which is substantially perpendicular to the axis 47.

Considering FIGS. 1, 4 and 7 it is apparent that the first body member 25 has a length measured parallel to the long axis 47 that is somewhat greater than the length of the second body member 27 as measured parallel to the same axis 47. In a specific embodiment of the apparatus 10, such lengths result from the configuration of the specific level 11 with which the apparatus 10 is used.

FIGS. 9 through 12 show another embodiment of a securing device 85 used to form the apparatus 10. Most preferably, two such devices 85 are used in the apparatus 10 and since the devices 85 are substantially identical, only one is described.

Such device 85 includes a cylinder-like body member 87 with an enlarged head 89 which extends along a body plane 91 substantially perpendicular to the long axis 47 of the level 11. The head 89 is dimensioned to be larger than the apertures 29, 31 and thereby forms an abutment shoulder 93 which contacts the level 11 and prevents the body member 87 from moving inwardly toward the middle of the level 11.

To frictionally retain the device 85 in a respective aperture 29, 31, the body member 87 includes at least one retention member 95. Most preferably, there are six retention members 95 in the form of radially outwardly extending ribs which frictionally engage the aperture wall when the device 85 is inserted.

The device 85 also has a pair of hooks 97, 99 which extend radially from the head 89 and are coincident with the plane 91. The included angle A2 between the hook axes 101, 103 is usually less than 150° and most preferably, is on the order of 75 to 90° or so. The hooks 97, 99 engage the ends 105, 107 of an elastic band 108. Where two devices 85 are used, as preferred, there are (of course) two such bands 108, one for each device 85.

While one securing device 85 or one of the devices 21, 23 may be used to mount the level 11 on the support 19, it is most preferred to use two devices 85 (or devices 21, 23) spaced apart by a dimension D1 approximating that of the overall length dimension of the level 11. To state it another way, the dimension D1 is preferably at least equal to 60% of the length of the level 11 and, for a specific level 11, by a dimension D1 about equal to 70–90% or more of the length of the level 11.

Referring next to FIGS. 13 and 14, yet another embodiment of the apparatus 10 includes a pair of securing devices 109 which are substantially identical to one another. Only one such device 109 is shown in FIG. 14 and includes a yoke-like body member 111 which engages the level 11 and, more specifically, which engages a rib 113 of such level 11. The body member 111 extends along a body plane 115.

First and second hooks 117, 119 extend from the body member 111 and are coincident with the plane 115. When the device 109 is used to secure the level 11 and the component 19 to one another, the first and second ends 121, 123, respectively, of an elastic band 125 are received on the hooks 117, 119, respectively.

As described above, the securing devices 21, 23 or 85 or 109 may be configured so that the hooks thereof extend axially (as in the embodiments of FIGS. 1–8) or radially (as in the embodiments of FIGS. 9–12 and 13–14) from the body member. Axially extending hooks are seemingly less apt to be inadvertently broken off by accidental "bumping" while radially extending hooks have substantially diminished bending moments imposed upon them by the elastic band which engages them.

As used herein, the term "elastic band" means any band, the length of which can be readily changed. Examples include what are commonly known as rubber bands, stretchable elastic strips, and non-stretching strips including a buckle or the like which permits change of length.

As used herein, the term "structural component" means any component to be installed during construction or modification of a building and having an installed position which is horizontal, vertical or at some predetermined angle from either.

While the principals of the invention are shown and described in connection with preferred embodiments, it is to be understood clearly that such embodiments are by way of example and are not limiting.

What is claimed:

1. An apparatus including;
   an elastic band having first and second ends;
   a body member to engage a level; and
   first and second hooks extending from the body member to receive the first and second ends, respectively,
   whereby the elastic band engages the body member and mounts the level to a structural component which is positioned between the elastic band and the level.

2. The apparatus of claim 1 wherein:
   the body member extends along a body axis; and
   the body member includes a retention rib extending along a rib axis generally perpendicular to the body axis.

3. The apparatus of claim 1 wherein:
   the body member extends along a body plane; and
   the hooks extend along respective hook axes generally perpendicular to the body plane.

4. The apparatus of claim 3 wherein:
   measured coincident with the plane, the included angle between the hook axes is usually about 180°.

5. The apparatus of claim 1 wherein:
   the body member extends along a body plane;
   the hooks extend along respective hook axes generally perpendicular to the body plane; and
   measured coincident with the plane, the included angle between the hook axes is usually less than 150°.

6. The apparatus of claim 1 wherein:
   the body member extends along a body plane; and
   the first and second hooks are coincident with the plane.

7. In combination, a level, a structural component and an apparatus for securing the level and the component to one another, the apparatus including:
   a securing device engaging the level; and
   an elastic band around the structural component and engaging the securing device, whereby the level is mounted to the structural component which is positioned between the elastic band and the level.

8. The combination of claim 7 wherein:
   the securing device includes a body member having first and second hooks extending therefrom; and
   an elastic band is around the component and has first and second ends engaging the first and second hooks, respectively.

9. The combination of claim 8 wherein:
   the body member extends along a body axis; and
   the body member includes a retention rib extending along a rib axis generally perpendicular to the body axis.

10. The combination of claim 7 wherein:
    the securing device comprises first and second securing devices; and
    the elastic band comprises first and second elastic bands around the structural component and engaging the first and second securing devices, respectively.

11. The combination of claim 10 wherein:

the first securing device includes a first body member having a first pair of hooks extending therefrom;

the second securing device includes a second body member having a second pair of hooks extending therefrom;

the first elastic band engages the first pair of hooks; and the second elastic band engages the second pair of hooks.

12. The combination of claim 11 wherein:

the level includes first and second apertures; and the first and second securing devices extend into the first and second apertures, respectively.

13. The combination of claim 12 wherein:

at least the first aperture is defined by a wall; and the first securing device includes a first retention rib contacting the wall.

14. The combination of claim 13 wherein:

each of the first pair of hooks extends axially from the first body member; and each of the second pair of hooks extends axially from the second body member.

15. The combination of claim 13 wherein:

each of the first pair of hooks extends radially from the first body member; and each of the second pair of hooks extends radially from the second body member.

16. An apparatus for mounting a level on a structural component and including;

a first elastic band having first and second ends;

a second elastic band having third and fourth ends;

a first body member to engage the level, the first body member extending along a first body axis and including a first retention rib extending along a first rib axis generally perpendicular to the first body axis;

a second body member to engage the level, the second body member extending along a second body axis and including a second retention rib extending along a second rib axis generally perpendicular to the second body axis;

first and second hooks extending from the first body member to receive the first and second ends, respectively; and third and fourth hooks extending from the second body member to receive the third and fourth ends, respectively.

17. The apparatus of claim 16 wherein the second retention rib includes an abutment shoulder to engage the level.

* * * * *